June 16, 1964 I. DORMAN 3,137,447

TELEPHONE LIGHT

Filed Dec. 21, 1961 2 Sheets-Sheet 1

INVENTOR.

ISIDORE DORMAN

BY H. Gibner Lehmann

AGENT

June 16, 1964 I. DORMAN 3,137,447

TELEPHONE LIGHT

Filed Dec. 21, 1961 2 Sheets-Sheet 2

INVENTOR.

ISIDORE DORMAN

BY H. Gibner Lehmann

AGENT

United States Patent Office 3,137,447

Patented June 16, 1964

3,137,447
TELEPHONE LIGHT

Isidore Dorman, Whitestone, N.Y., (% Dorman Manufacturing Company, 14—34 112th St., College Point, N.Y.), assignor of one-half to Henry H. Schulman, Bronx, N.Y.

Filed Dec. 21, 1961, Ser. No. 161,140
2 Claims. (Cl. 240—2.17)

This invention relates to telephone light devices, and more particularly to small electric light devices which are attachable to a telephone desk set, for the purpose of illuminating the dial and dial numbers thereof.

An object of the invention is to provide a novel and improved electric light attachment for a telephone desk set, which attachment is especially small and compact whereby it requires but little space, and is further ununobtrusive and attractive in appearance.

Another object of the invention is to provide an improved telephone light attachment as above set forth, which while utilizing a relatively weak light source in the form of a small flashlight bulb, still effectively illuminates the dial and dial numbers of the telephone desk set.

A further object of the invention is to provide an advantageous electric light attachment in accordance with the foregoing, which conducts or "pipes" light from a single source such as a small lamp and distributes the same in an effective manner to different areas or portions of the dial and dial face plate.

Still another object of the invention is to provide a novel light attachment as characterized, wherein both automatic and manual switching means are provided while utilizing few and simple components which may be produced and assembled at low cost.

A feature of the invention resides in the provision of an improved and simplified light attachment of the kind set forth, wherein a single switch component in the form of a resilient blade is utilized in effecting all of the switching functions, both automatic and manual.

Another feature of the invention resides in the provision of a light attachment as outlined, which provides a duplicate and readily illuminable set of dialing numbers and letters which are so arranged as to be more easily and completely lighted from the single, small lamp source.

Another feature of the invention resides in the provision of a telephone light attachment which is so arranged as to be easily and quickly applied and installed, even by an unskilled person and without the use of tools.

Other features and advantages will hereinafter appear.

In the drawings accompanying this specification, similar characters of reference are used to designate like components throughout the several views, in which.

Figure 1:
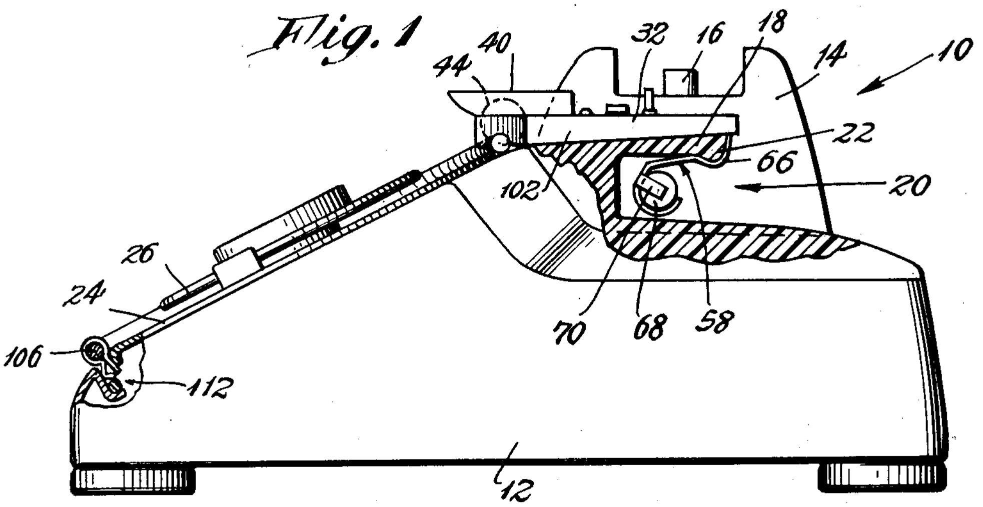
FIG. 1 is a side elevational view of a telephone desk set and light attachment as provided by the invention, a portion of the desk set being broken away and shown in section to reveal interior details.

Referring first to FIGS. 1–6 there is illustrated a usual type of telephone desk set which is designated generally by the numeral 10. The desk set 10 has a rectangular body portion 12 with upstanding cradle members 14 provided with the usual plunger type switch operators 16. The desk set 10 further has a bridge or handle 18 in the form of a flat portion extending between or bridging the cradle members 14 and defining a socket or recess 20 adapted to receive the fingers of the hand when the desk set is being handled or carried. The handle 18 has a detent bead 22 extending along its rear edge, as shown.

The desk set 10 further has the usual dial or number plate 24 above which there is rotatably mounted the apertured dial 26 having the station number window or card holder. Adjacent the periphery of the dial 26 is the usual finger stop, which limits the extent of turning of the dial in accordance with the particular aperture occupied by the operating finger.

In accordance with the present invention there is provided a unique dial illuminating attachment for the desk set 10, which has a number of desirable features and advantages. The attachment is especially small and compact, requiring but little space while at the same time providing all the illumination necessary to properly light the dial and number plate. Moreover, the attachment carries its own source of energy, is automatic as to its operation and may be easily and quickly installed by the lay person and without requiring appreciable skill. Further, the attachment is unobtrusive and attractive in appearance.

Figure 2:
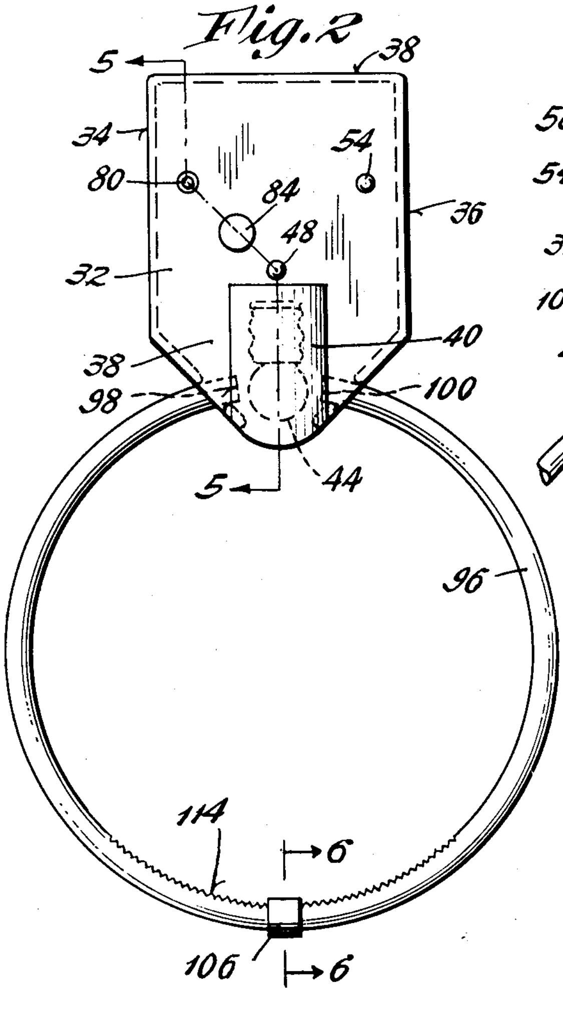
FIG. 2 is a top plan view of a light attachment per se, as shown in FIG. 1 and representing one embodiment of the invention.
Figure 5:
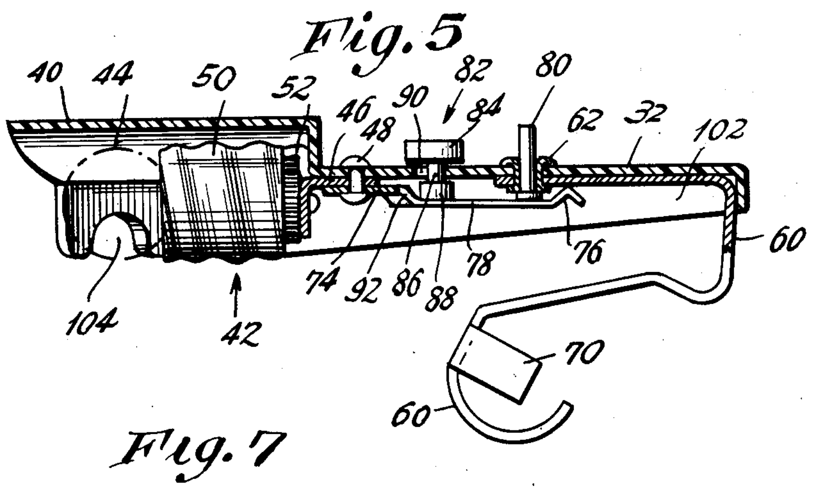
FIG. 5 is a fragmentary vertical sectional view taken on the line 5—5 of FIG. 2.

As seen in FIGS. 1 and 2, the light attachment comprises a relatively small, flat base member 32 which may be advantageously constructed as a molded rigid plastic piece. The base member 32 has parallel side edges 34 and 36, a generally straight rear edge 38 disposed at right angles to the side edges 34 and 36, and an angle-shaped front portion 38 provided with a raised lamp housing 40 in the form of a low, curved shell. At the location of the lamp housing or shell 40 space is provided to accommodate an electric socket 42, as shown in FIG. 5, as well as an incandescent lamp indicated in dotted outline at 44. The socket or receptacle 42 is mounted in any suitable manner, as by fastening the center terminal or connector 46 to the base member 32 with a rivet 48. The shell 50 of the socket 42 may have a metal conductor strip 52 which is arranged to extend diagonally to a rear side portion of the base 32, to be secured thereto by an eyelet 54.

By the present invention the base 32 is provided with a combined spring clip means and battery holder, by which it is attached to the handle portion 18 of the desk set 10 and by which a flashlight battery is supported in the finger socket or recess 20 of the desk set to supply current for the lamp 44.

Figure 3:
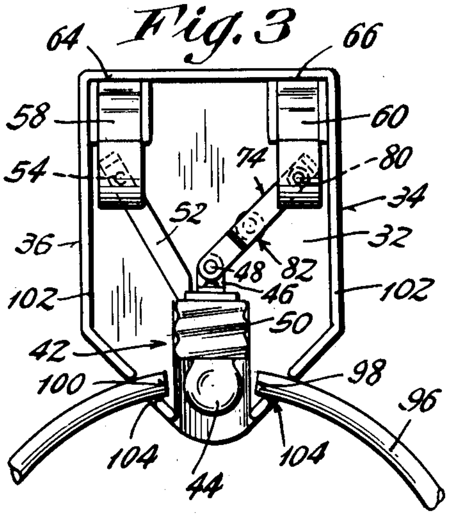
FIG. 3 is a fragmentary bottom plan view of the light attachment of FIGS. 1 and 2.
Figure 4:
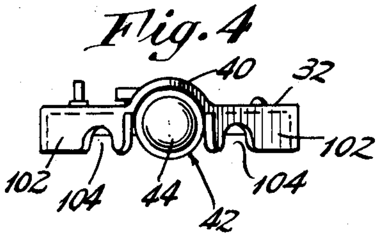
FIG. 4 is a front elevational view of the base member of the light attachment and assemblage associated with said member.

Referring to FIGS. 1, 3 and 5, the combined clip and holder device comprises a pair of resilient metal arms 58 and 60, the arm 58 being adavantageously secured to the base 32 by means of the eyelet 54 which holds the conductor strip 52. The clip and holder arm 60 is similarly secured to the base 32 by an eyelet 62, in a position opposite to the clip 58.

The clips 58 and 60 have depending portions 64 and 66 respectively in the nature of yokes, since these join the fastened base portions of the arms and the battery holder portions now to be described. As seen best in FIG. 1, the battery holder portions of the arms 58 and 60 extend forward under the handle 18 of the desk set, and have upwardly off-set portions or bends which are engageable with the detent bead 22 of the handle. The extremities of the arms 58, 60 are bent or curved to form holding sockets for a small flashlight battery 68, and tabs such as the end tab 70 shown in FIG. 1 are provided on the arms 58, 60 to make contact with the ends of the battery 68 and to conduct current to and from the same.

It will be understood that the battery 68 may be pressed into the curved holder portions of the arms 58 and 60 and will be retained thereby, by virtue of the resilience of the stock.

Besides functioning as spring clips to retain the dial light attachment on the handle 18 of the desk set, the arms 58 and 60 not only carry the current source (in the form of the battery 68) but also constitute conductor or circuit means, by which the energy of the battery is brought to the incandescent lamp 44. It will be observed that the spring clip 58 is electrically connected to the shell 50 of the lamp socket 42, by which a conducting connection is established between one terminal of the battery and the lamp 44.

In accordance with the invention, a novel and improved combined automatic and manual "on-off" switch means is associated with the remaining spring clip arm 60 and the center terminal and support 46 of the socket 42. The said switch means functions to automatically effect energization of the lamp 44 whenever the telephone hand set is removed from the desk set 10. Also, by virtue of the provision of the manually operable switch, the energized light may be shut off at will, depending on the circumstances of use of the telephone. The said combined automatic and manual switch means is of extremely simple construction, involving relatively few components which may be economically fabricated and assembled.

Referring to FIGS. 1, 3 and 5, the said "on-off" switch means comprises a resilient switch blade 74 secured, at one end, under the rivet 48 which fastens the center terminal 46 of the socket to the base 32. The switch blade 74 extends diagonally rearward and at its other extremity has a V-section contact portion 76 which underlies and is adapted to engage the base portion of the spring clip 60. The contact blade further has a downwardly off-set actuator portion 78, part of which is disposed below the eyelet 62 which secures the spring clip 60 to the base.

Slidably carried in the eyelet 62 and constituting the automatic actuator for the switch blade 78 is a small plunger 80, fabricated of insulating material such as rigid plastic. The plunger 80 slides easily in the eyelet 62, which latter acts as a bearing for the plunger as seen in FIG. 5. The lower end of the plunger 80 rests on the switch blade 74, 78. Downward pressure on the plunger will shift it and the blade downward to disengage the contacting portion 76 of the blade from the base of the spring clip 58. Such action thereby opens the "on-off" switch.

Referring to FIG. 1, the automatically actuated plunger 80 is seen as disposed in the path of movement of the telephone hand set when the latter is being replaced on the desk set 10. Thus, the weight of the hand set will provide sufficient force to depress the plunger 80, effecting an opening of the switch and extinguishing the lamp 44.

Whenever the hand set is removed from the cradle, however, the resilience and bias of the switch blade 74, 78 will restore it to the circuit-closing position shown in FIG. 5, the plunger 80 being raised during such process.

The invention further provides a novel and simplified manually operable switch operator means for engagement with the switch blade 74, 78. The said operator means comprises a slide member in the form of a small button having a head portion 84, a shank 86 and a bottom enlargement 88, the latter resting on the downwardly off-set portion 78 of the switch blade 74. The button 82 is carried in a slot 90 provided in the base member 32, and is shiftable between a circuit closing position as shown in FIG. 5, and a position shifted to the left wherein it effects a downward movement of the switch blade 74, 78 and separates the contact portion 76 thereof from the resilient clip 58. In accomplishing such movement of the blade, the enlargement 88 of the button 82 engages a camming portion or offset 92 provided on the blade 74, by which the latter is cammed downward upon right-to-left movement of the button 82, as will be understood from an inspection of FIG. 5.

Because of the sliding and camming action of the switch button 82 it will remain in either the closed-circuit position shown in FIG. 5 or else the open-circuit position as described above, and such switch button will dominate the operation of the switch to the exclusion of the automatically operated plunger 80 only as regards the opening of the circuit. However, when the button 82 is in the closed circuit position shown, the plunger 80 will be effective to either open or close the switch depending on its position.

By the above novel switching arrangement, the lamp 44 is automatically energized each time the telephone hand set is removed from the cradle 14 for the purpose of using the telephone. Further, if the user should desire to extinguish the lamp during use of the telephone, it is merely necessary for him to shift the button 82 from the closed circuit position of FIG. 5 to the left, as viewed in this figure, thereby camming downward the switch blade 74 and separating the contacting tip 76 thereof from the clip 58.

In conjunction with the light and switch assemblage above set forth there is further provided by the invention an improved light conducting or "piping" means by which portions of the dial 26 and number plate 24 which are remote from the lamp 44 will be adequately illuminated.

Referring to FIG. 1, the shell or housing 40 for the lamp 44 is shown as disposed adjacent the upper portion of the number plate 24 and dial 26 of the desk set. Light from the lamp 44 will thus pass forward and downward, and will light up the dial and number plate so that dialing of the telephone may be carried out in the dark. The invention further provides an improved organization by which the light from the lamp 44 is more evenly distributed about the various portions of the dial and number plate.

The said light conducting and distributing device comprises essentially a simple light conducting member comprising a ring 96 of clear plastic, having a polished outer surface and having a pair of oppositely located juxtaposed light receiving edges 98 and 100 arranged for disposition on opposite sides of the lamp 44 to conduct rays therefrom through and along the ring whereby the latter is adapted to provide a circle of light along the outside of the dial 26 and dial plate 24.

Figures 6, 7, 8, 9:
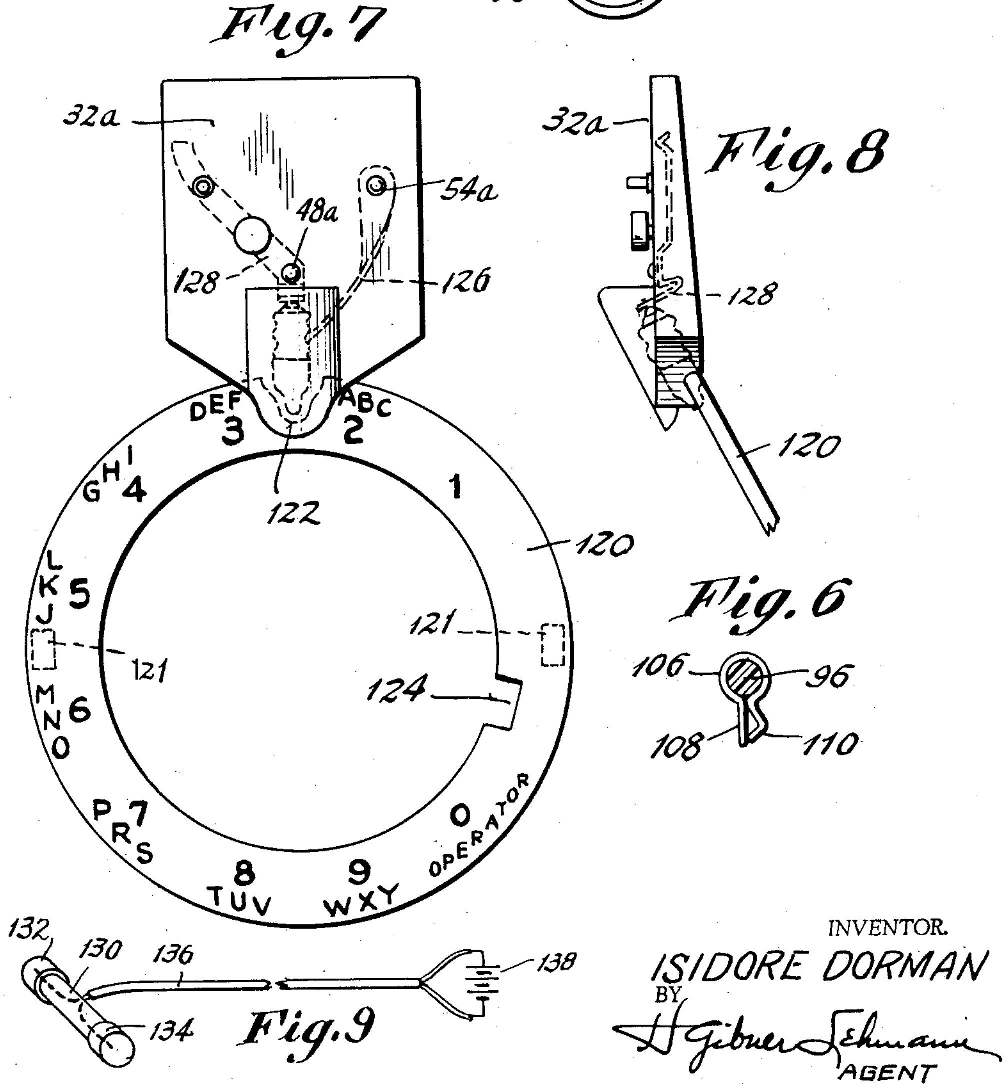
FIG. 6 is a fragmentary sectional view, taken on the line 6—6 of FIG. 2.
FIG. 7 is a top plan view of a light attachment illustrating another embodiment of the invention.
FIG. 8 is a fragmentary side elevational view of the light attachment of FIG. 7.
FIG. 9 is a perspective view of a power supply adapter which may replace the battery.

Preferably, as shown in FIGS. 1 and 3–5, the base member 32, which has a depending peripheral flange 102, is provided with notches 104 to accommodate the end portions of the light conducting ring 96. Further, a spring mounting clip 106 is carried by the light piping member 96 at a point opposite the light receiving edges 98, 100 for the purpose of securing the ring 96 to the desk set 10. As seen in FIGS. 1 and 6 the mounting clip 106 has a straight resilient leg portion 108 and a bent resilient leg portion 110, said leg portions being adapted to extend into a crack or opening 112 located between the number plate 24 of the desk set and the front wall portion of the body 12. By the provision of the clip 106, in conjunction with the clip mounting of the base plate 32, the light attachment is held in place on the desk set 10, as will be now understood.

Preferably, as seen in FIG. 2, the lower inner surface of the light piping ring 96 is provided with serrations 114, which function to cast out and inward of the ring 96, the light which is being conducted through the same. Accordingly, as thus constructed the light piping ring 96 effects an illumination of the lower portions of the dial 26 and number plate 24, and renders the lighting of these parts more uniform, as effected by the single lamp 44. It will be understood that all portions of the light piping ring 96 will be visible in the dark, the remote portions being brighter by virtue of the roughening or knurling 114, and this condition in conjunction with the light emitted directly from the lamp 44 and striking the telephone dial and number plate, will provide the illumination needed for using the telephone in the dark.

Another embodiment of the invention is illustrated in FIGS. 7 and 8. This embodiment differs from that of FIGS. 1–6 in the type of light piping member or ring which is utilized. Also, the base member of the attachment is slightly modified, to accommodate the different shape of the light piping member. Further, a smaller incandescent lamp of the type known as a "nipple" bulb is illustrated in FIGS. 7 and 8.

Otherwise, the components of the attachment which are carried by the base member and which involve the switching, and energization of the lamp and attachment of the base member to the desk set, are identical to those already described above.

In FIGS. 7 and 8 the base member **32*a* is cut away at its forward portion to accommodate a flat circular light-piping ring 120, the latter having a large notch 122 with a rounded edge to provide clearance for the envelope of the incandescent lamp 44. The light piping member 120 also has a clearance notch 124 in its inner periphery, to provide clearance for the finger stop of the desk set. The ring or member 120 is adapted to overlie the number plate 24 of the desk set, and is provided with numbers and letters as indicated, corresponding to those commonly used on the telephone number plate. The numbers and letters on the ring 120 are preferably engraved in the underside, whereby they will interrupt light which is being conducted by the member from the lamp 44 and will become illuminated in consequence. The notch 124 of the ring 120 may be arranged to loosely fit the finger stop, and additional mounting means may be provided if desired to fasten the ring to the desk set 10. For example, the underside of the ring 120 may be provided with raised surfaces or lands 121 adapted to conform to portions of the upper surface of the desk set, and a pressure-sensitive adhesive may be provided on the lands 121** to adhere the ring to the desk set. The pressure sensitive adhesive may further be constituted of a double coated section of adhesive tape, as will be readily understood.

In place of the socket shell 50 illustrated in FIGS. 3 and 5, the nipple type bulb may be held without benefit of a metal socket shell, by engagement between the threads of the base of the bulb and the end of a metal conductor strip 126, said end being positioned in the bore or receptacle provided for the bulb base. The conductor strip 126 may have a twist in it, whereby the remaining end may be secured under the rivet **54*a* shown in FIG. 7. Also, the tip or end terminal of the incandescent bulb may be engaged by a resilient leaf spring type conductor strip 128, as seen in FIGS. 7 and 8, said strip being secured under the rivet 48*a*** shown. Thus, a simplification for the mounting of the bulb is effected.

A power supply adapter for use in place of the battery in the clips 58 and 60, is illustrated in FIG. 9. This adapter may comprise a small section of plastic rod 130 having metal end caps 132 and 134, the said end caps being connected to the conductors of a cable 136 which may be energized from a battery 138 or other suitable source. This power adapter is thus intended to replace the battery which would be otherwise carried by the clip 58, 60.

It will now be understood from the foregoing that I have provided a novel and improved electric light attachment for a telephone desk set, which has a number of features and advantages. The device employs relatively few components and may be economically fabricated whereby the production cost is held to a low figure. The device is small and unobtrusive, and may be easily and quickly applied even by an unskilled person. In spite of its small size, it will effectively illuminate the dial and adjoining portions of the desk set, to enable the telephone to be readily used in the dark. The source of energy for the device is conveniently supplied by the single small flashlight battery, which is mounted and located in a unique manner so as to be out of the way, thereby enhancing the attractiveness of the attachment.

Variations and modifications may be made within the scope of the claims, and portions of the improvement may be used without others.

I claim:

1. An electric light device for a telephone desk set comprising, in combination:

(*a*) a base member adapted to be disposed on the handle of the desk set, (*b*) a first current-conducting combined spring clip and battery holder device secured to the base member to secure the same to said handle, (*c*) said device having a U-shaped resilient strip anchored at one end to the base member and having a leg portion extending under the base member in spaced relation thereto, for engagement with the underside of the handle, (*d*) said device further including a battery clip carried by the resilient strip and including circuit means connected with the strip to carry current therefrom, and (*e*) an electric lamp socket on the base member, one terminal of which is connected with said circuit means to be energized therethrough and arranged to enable a lamp carried thereby to light the dial of the telephone desk set, (*f*) a second current-conducting combined spring clip and battery holder device separate and electrically insulated from the first device and secured to the base member to secure the same to said handle, said second device comprising a U-shaped resilient strip which is anchored at one end to the base member and which has a leg portion extending under the base member in spaced relation thereto for engagement with the underside of the handle, said second strip being in parallelism with the first resilient strip and said second device including a battery clip carried by the resilient strip thereof and further including circuit means connected with the second resilient strip and with the other terminal of said lamp socket to carry current therebetweeen, (*g*) said resilient strips carrying the battery clips thereof at their free extremities, and further having at their free extremities individual contact means continuously engageable respectively with the terminals of a battery carried by the said battery clips, (*h*) said strips having bent clamping portions intermediate their ends, for clamping onto the handle of the desk set.

2. An electric light device as in claim 1, wherein:

(*a*) the clamping portions of each resilient strip comprise a straight strip portion and a cooperable angle-shaped strip portion having a bend presenting a hump in the direction of the straight strip portion.

References Cited in the file of this patent

UNITED STATES PATENTS

| | | |
|---|---|---|
| 2,259,148 | Burkhart | Oct. 14, 1941 |
| 2,442,988 | Satz | June 8, 1948 |
| 2,480,393 | Bosseit et al. | Aug. 30, 1949 |
| 2,516,180 | Brown | July 25, 1950 |
| 2,558,437 | Hronec | June 26, 1951 |
| 2,561,950 | Shenk | July 24, 1951 |
| 2,624,965 | Griswold | Jan. 13, 1953 |
| 2,988,631 | Hershey et al. | June 13, 1961 |